United States Patent [19]

Arita et al.

[11] Patent Number: 5,063,042

[45] Date of Patent: Nov. 5, 1991

[54] PROCESS FOR THE PRODUCTION OF CARBON FIBERS

[75] Inventors: Yoshikazu Arita; Toshi Iizuka, both of Takasaki; Yukio Abe, Maebashi; Yoshio Nakamura, Kiryu; Shoji Takigami, Kiryu; Machiko Takigami, Kiryu, all of Japan

[73] Assignee: Gunei Kagaku Kogyo Kabushiki Kaisha, Japan

[21] Appl. No.: 447,046

[22] Filed: Dec. 7, 1989

[30] Foreign Application Priority Data

Feb. 17, 1989 [JP] Japan .................................. 1-39113

[51] Int. Cl.$^5$ ................................................ D01F 9/20
[52] U.S. Cl. .................................. 423/447.4; 502/180
[58] Field of Search ............. 423/447.4, 447.9, 449.1; 502/180; 264/44, 41

[56] References Cited

U.S. PATENT DOCUMENTS

| 3,395,970 | 8/1968  | Machell       | 423/447.9 |
| 3,809,673 | 5/1974  | White et al.  | 423/447.1 |
| 3,852,428 | 12/1974 | Powell et al. | 423/447.1 |
| 3,903,220 | 9/1975  | Economy et al.| 423/447.4 |
| 3,964,952 | 6/1976  | Brié et al.   | 423/447.1 |
| 4,918,117 | 4/1990  | Snow et al.   | 423/447.1 |

FOREIGN PATENT DOCUMENTS

| 57-51109 | 3/1982 | Japan          | 423/449 |
| 730686   | 5/1955 | United Kingdom | 423/449 |

*Primary Examiner*—Gary P. Straub
*Assistant Examiner*—Stuart L. Hendrickson
*Attorney, Agent, or Firm*—Lorusso & Loud

[57] ABSTRACT

Carbon fibers with a large specific surface area are obtained by a process which comprises the steps of:
(a) providing cured novolak resin fibers;
(b) impregnating the novolak resin fibers with a polymerizable vinyl monomer;
(c) polymerizing the vinyl monomer; and
(d) carbonizing the novolak resin fibers containing the polymerized vinyl monomer.

8 Claims, No Drawings

PROCESS FOR THE PRODUCTION OF CARBON FIBERS

BACKGROUND OF THE INVENTION

This invention relates to a process for the production of activated carbon fibers.

Activated carbon fibers are generally produced from polyacrylonitrile fibers, cellulose fibers, cured novolak resin fibers and carbonaceous pitch fibers. Because of their high adsorption power and of easiness to be formed into desired shapes such as cloth, sheet or felt like forms, activated carbon fibers are utilized in a wide variety of applications.

One problem associated with known activated carbon fibers relates to their expensiveness which is attributed to low yield of the carbon fibers in known processes for the production thereof. For example, when activated carbon fibers having a BET specific surface area of 2,500 $m^2/g$ or more are intended to be produced using the above precursor fibers by conventional processes, the yield is as low as about 15%.

BRIEF SUMMARY OF THE INVENTION

It is, therefore, an object of the present invention to provide a process by which activated carbon fibers can be produced from cured novolak resin fibers with a high yield.

Another object of the present invention is to provide a process of the above-mentioned type which can produce activated carbon fibers having a large specific surface area of, for example, 2,500 $m^2/g$ or more.

The present inventors have found that slow rate of an activation gas in diffusion into precursor fibers accounts for the low yield of the activated carbon fibers in the conventional processes. That is, in the conventional processes, an activation gas such as steam or carbon dioxide is used for the activation of precursor fibers. The activation is effected as a result of solid-gas reactions between the precursor fibers and the activation gas which proceed through mass transfer to outer surfaces of the fibers, mass transfer to inside surfaces of the fibers and reaction within the fibers. In the conventional process, the step of the mass transfer into the fibers is a rate determining step. Since this step proceeds slowly, the activation occurs mainly on the outer surfaces of the fibers rather than in the interior thereof. As a consequence, the diameter of the fibers gradually decreases as the reaction proceeds and the yield of the activated carbon fibers becomes low. On the basis of the above findings, the present inventors have made an extensive study for developing a new process which can yield activated carbon fibers with an improved yield and have found that when novolak resin fibers impregnated with a polymer formed in situ by polymerization of a polymerizable monomer are calcined and activated, activated carbons having a large surface area can be obtained with a high yield.

In accordance with the present invention there is provided a process for the production of activated carbon fibers, comprising the steps of:
(a) providing cured novolak resin fibers;
(b) impregnating said novolak resin fibers with a polymerizable vinyl monomer;
(c) polymerizing said vinyl monomer; and
(d) carbonizing and activating said novolak resin fibers containing the polymerized vinyl monomer.

The reason for why the above process of the present invention can produce activated carbon fibers having a large surface area with a high yield is considered as follows. When a vinyl monomer incorporated into novolak resin fibers is polymerized, the resin fibers are swelled or inflated. Since the yield of residual carbon is lower than that of the resin fiber matrix, there are formed a multiplicity of pores when the polymer-containing resin fibers are carbonized. Therefore, the activation gas can be rapidly diffused within the precursor fibers so that the activation can proceed more easily as compared with that in the conventional process.

Other objects, features and advantages of the present invention will become apparent from the detailed description of the invention to follow.

DETAILED DESCRIPTION OF THE INVENTION

The cured novolak resin fibers to be used in the process of the present invention may be obtained by any conventional method such as a method including the steps of melt spinning a novolak resin into fibers and curing the spun fibers. The novolak resin may be, for example, a resin obtained by polycondensation reaction of a phenol or its derivative with an aldehyde in an acidic condition. Examples of the phenol derivatives include alkylphenols, alkoxyphenols, halogenated phenols, resorcinol and other polyphenols. Examples of the aldehydes include formaldehyde, paraformaldehyde, furfuraldehyde, chloral and acetoaldehyde. The cured novolak resin fibers may be in any form such as fibers, woven or nonwoven fabrics, threads or felt.

As the polymerizable vinyl monomer with which the above novolak fibers are impregnated, there may be used any vinyl monomer which can be polymerized upon being energized by, for example, heat, light, electron beam or radioactive ray in the presence or absence of a polymerization catalyst. Such a vinyl monomer may be, for example, an acrylate such as methyl acrylate or ethyl acrylate; a methacrylate such as methyl methacrylate, propyl methacrylate; acrylamide; methacrylamide; acrylonitrile; methacrylonitrile; an aromatic vinyl monomer such as styrene or ethylstyrene, a vinyl ester such as vinyl acetate, a vinyl halide such as vinyl chloride; a vinylidene halide such as vinylidene chloride; or maleic anhydride.

The impregnation of the cured novolak resin fibers with the polymerizable vinyl monomer is preferably performed by immersing the fibers in a solution or dispersion containing the polymerizable vinyl monomer. The monomer solution or dispersion may contain an effective amount of a polymerization catalyst such as ammonium seric nitrate or ammonium persulfate.

The amount of the polymerizable monomer incorporated into the novolak resin fibers is generally 10–250% by weight, preferably 30–150% by weight based on the novolak resin fibers.

The cured novolak resin fibers impregnated with the vinyl monomer is subjected to polymerization conditions in a manner known per se such as by exposure to heat, light (inclusive of visible and UV rays), X-ray, electron beam or radioactive ray. After the completion of the polymerization, the fibers are preferably washed with a suitable solvent to remove unreacted monomer to obtain polymer-containing fibers having a polymer content of generally 2–120% by weight, preferably 4–80% by weight based on the weight of the novolak resin fibers.

The polymer-containing fibers are then carbonized and activated in any known manner to obtain activated carbon fibers. The activation can be conducted simultaneously with or following the carbonization.

The carbonization, when conducted prior to the activation, may be performed by heating the polymer-containing novolak fibers at a temperature of 600°–2000° C. in the atmosphere of an inert gas such as a nitrogen gas or an argon gas. The activation may be performed by heating the carbonized fibers in the atmosphere of an oxidizing gas such as steam, carbon dioxide or air at a temperature of 600°–1300° C. When the carbonization and activation are to be simultaneously performed, the polymer-containing fibers are heated at 600°–2000° C. in the atmosphere of steam, carbon dioxide or air. The following examples will further illustrate the present invention. In the examples, "parts" and "%" are by weight except otherwise specifically noted.

EXAMPLE 1

Cured novolak resin fibers (Kynol KF-0270M, manufactured by Gunei Kagaku Kogyo K. K.) were dried in vacuo and about 5 g of the dried fibers were immersed in a solution composed of 50 parts of methyl methacrylate and 50 parts of methanol. The fibers were taken out of the solution and softly squeezed for removal of excess solution. The weight of the fibers thus impregnated with the methacrylate solution was increased to about 12 g. The impregnated fibers were then exposed to an electron beam of 20 Mrad at 35° C. for 5 minutes to cause the methacrylate to polymerize. After completion of the polymerization, the fibers were extracted with acetone for 5 hours using a Soxhlet extractor for the removal of unreacted methacrylate to obtain about 7 g of polymethyl methacrylate-containing novolak resin fibers. Microscopic observation revealed that these fibers had about 1.1 times as great diameter as the non-treated fibers. The polymer-containing fibers were then carbonized and activated using a mixed gas consisting of steam and nitrogen and obtained by continuously passing a nitrogen gas through a warm water maintained at 80° C. Thus, the fibers were charged in a quartz tube having an inside diameter of 70 mm and the tube placed in an electric oven. The fibers were heated at a heating rate of 5° C. per minute. When the temperature of 300° C. was reached, the introduction of the mixed gas into the tube was commenced and the heating was continued at the same heating rate until a temperature of 900° C. was reached. The fibers were heated at that temperature for 40 minutes in the mixed gas stream. The heating was then stopped and a nitrogen gas was passed through the fibers for cooling same, thereby obtaining activated carbon fibers with a yield of 34% based on the weight of the polymer-containing fibers prior to the carbonization and activation treatment. The activated carbon fibers had a specific surface area of 2740 m$^2$/g. The surface area is BET surface area measured by a nitrogen sorption method using a flow-type automatic surface area measuring device MICROMERITICS FLOWSORB 2300 TYPE II (manufactured by MICROMERITICS INC.).

EXAMPLE 2

5 Parts of methyl methacrylate, 0.2 part of ammonium seric nitrate, 0.1 part of polyoxyethylene-sorbitan monolaurate (NISSAN NONION LT-221, manufactured by Nihon Yushi K. K.) and 94.7 parts of water were mixed to obtain an emulsion. Cured novolak resin fibers (Kynol KR-0204, manufactured by Gunei Kagaku Kogyo K. K.) were immersed in the emulsion with a weight ratio of the fibers to the emulsion of 1:100 and treated therewith at 50° C. for 4 hours, so that the methacrylate was polymerized. After completion of the polymerization, the fibers were extracted with acetone for 15 hours using a Soxhlet extractor for the removal of unreacted methacrylate to obtain polymethyl methacrylate-containing novolak resin fibers. Microscopic observation revealed that these fibers had about 1.05 times as great diameter as the non-treated fibers. The polymer-containing fibers were then carbonized and activated in the same manner as that in Example 1 to obtain activated carbon fibers with a yield of 32% based on the weight of the polymer-containing fibers prior to the carbonization and activation treatment. The activated carbon fibers had a BET surface area of 2630 m$^2$/g.

COMPARATIVE EXAMPLE 1

Cured novolak resin fibers (Kynol KF-0270M, manufactured by Gunei Kagaku Kogyo K. K.) were charged as such into a quartz tube with an inside diameter of 70 mm and carbonized and activated in the same manner as that in Example 1 except that the time period through which the fibers were maintained at 900° C. was increased from 40 minutes to 90 minutes. The yield of the activated carbon fibers was 9% based on the weight of the novolak fibers prior to the carbonization and activation treatment. The activated carbon fibers had a BET surface area of 2670 m$^2$/g.

COMPARATIVE EXAMPLE 2

Cured novolak resin fibers (Kynol KF-0270M, manufactured by Gunei Kagaku Kogyo K. K.) were charged as such into a quartz tube with an inside diameter of 70 mm and carbonized and activated in the same manner as that in Example 1 except that the time period through which the fibers were maintained at 900° C. was decreased from 40 minutes to 10 minutes. The yield of the activated carbon fibers was 37% based on the weight of the novolak fibers prior to the carbonization and activation treatment. The activated carbon fibers had a BET surface area of 1080 m$^2$/g.

It is evident from the above results that the process according to the present invention can produce activated carbon fibers having a large surface area with a high yield.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the production of carbon fibers, comprising the steps of:
   (a) providing novolak resin fibers;
   (b) impregnating said novolak resin fibers with a polymerizable vinyl monomer;
   (c) polymerizing said vinyl monomer and swelling said fibers;
   (d) carbonizing said novolak resin fibers containing the polymerized vinyl monomer; and
   (e) activating said carbonized fibers.

2. A process as claimed in claim 1, wherein said polymerizable vinyl monomer is a member selected from the group consisting of acrylates, methacrylates, acrylamide, methacrylamide, acrylonitrile, methacrylonitrile, aromatic vinyl monomers, vinyl esters, vinyl halides, vinylidene halides and maleic anhydride.

3. A process as claimed in claim 1, wherein step (a) includes immersing said novolak resin fibers in a solution or dispersion containing said polymerizable vinyl monomer.

4. A process as claimed in claim 1, wherein step (c) is effected by heating or by radiation of light beams, electron beams or radioactive rays.

5. A process as claimed in claim 1, wherein step (e) is effected by heat treating said carbonized fibers in the atmosphere of an oxidizing gas.

6. A process as claimed in claim 1, wherein step (d) and step (e) are performed simultaneously.

7. A process as claimed in claim 5 wherein said heat treating is at a temperature of 600°–1300° C.

8. A process as claimed in claim 6 wherein said steps (d) and (e) are conducted at a temperature of 600°–2000° C. in the presence of an oxidizing gas.

* * * * *